Jan. 20, 1942.  R. TEWKSBURY  2,270,358

THREADING MACHINE

Filed Jan. 5, 1940  2 Sheets-Sheet 1

INVENTOR.
ROGER TEWKSBURY
BY Robert W. Wilson
ATTORNEY.

Jan. 20, 1942.   R. TEWKSBURY   2,270,358
THREADING MACHINE
Filed Jan. 5, 1940   2 Sheets—Sheet 2

INVENTOR.
ROGER TEWKSBURY
BY Robert W. Wilson
ATTORNEY.

Patented Jan. 20, 1942

2,270,358

UNITED STATES PATENT OFFICE 2,270,358

THREADING MACHINE

Roger Tewksbury, Willowick, Ohio, assignor to The Oster Manufacturing Company, Cleveland, Ohio, a corporation of Ohio Application January 5, 1940, Serial No. 312,547

5 Claims. (Cl. 10—87)

This invention pertains to a machine for threading, reaming and cutting pipe, characterized by various features of simplicity of construction, accuracy and ease of disposition of working elements, advantages in positioning stock, and related features, all for the result of more accurate, more efficient and quicker work, as will become apparent from the following description.

Specifically the invention provides improvements relating to such features as: effecting a cycle of operations of loading, threading, reaming and cutting off with a minimum of movement of the machine elements and movements by the operator; providing a carriage to apply any one of a number of tools to revolving stock; special arrangements for threading nipples; improvement in the manner of moving the carriage; mounting such carriage and tools carried thereby in such a manner that great accuracy of alignment of the carriage or of the tools is not necessary; a construction in which the amount of close finishing of parts is sharply reduced without loss of accuracy in the work turned out by the machine; adjustment of the tools to the work by a floating action; distribution of wear on elements of the mechanism to avoid concentration of stress; a convenient and accessible arrangement of tools upon the tool carriage whereby all of them may constantly be maintained upon the carriage and instantly accessible to be brought into play by a minimum of effort by the operator and without requiring adjustment, but at the same time keeping the tools not in use out of the way of those being used; improvements in certain tools; better arrangements for circulation of cutting oil; superior housing and framing features; a better thread length gauge.

Other advantages will appear from the detailed description and from the accompanying drawings, which disclose in detail a preferred form of the invention without excluding such variations in form as may fall within the scope of the claims.

In the accompanying drawings

Figure 11:
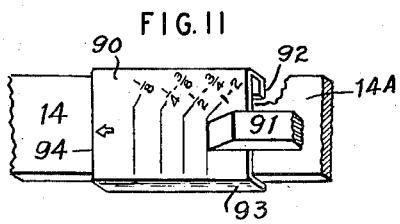

Figs. 6 to 10 inclusive are diagrammatic plans of carriage and ways only, illustrating the operating cycle; and Fig. 11 is an enlarged detail of the length gauge.

Figure 1:
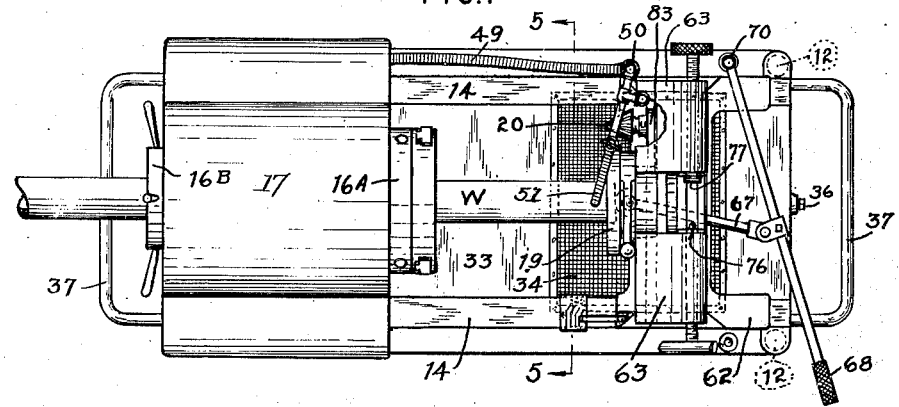
Fig. 1 is a plan view of the machine, showing parts in threading position.
Figure 2:
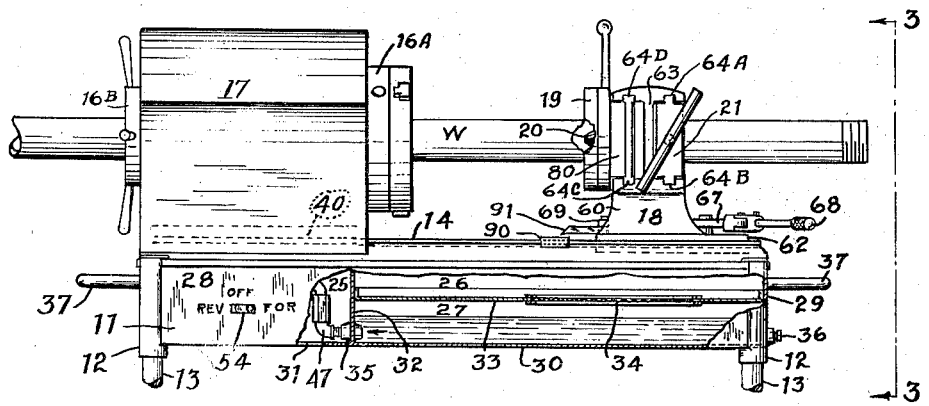
Fig. 2 is a side elevation with certain elements broken away, showing parts in cut-off position.

Throughout the description "out" is to the right and "in" is to the left of Figs. 1 and 2.

The machine is particularly intended for portable sizes, although many of its features are not limited thereto. It comprises a box-like base 11 with corner sockets 12 for stand legs 13 and strengthened by longitudinal ways 14 over the full length of the top of the base, which ways also carry the motor 15, front and rear chucks 16A and 16B; a hood 17; carriage 18 on the ways, with threading, reaming and cut-off tools 19, 20 and 21 respectively on the carriage; and various accessory features.

Base and spindle

The base 11 comprises a box generally open-topped, divided into compartments 25, 26 and 27 and stiffened by the longitudinal ways 14 which the box walls support. The preferred construction is sheet metal, welded. Sides 28 and ends 29 are welded to the sockets 12 as corner posts; the bottom is completely covered by a plate 30 with an access opening 31 beneath the machinery space; a transverse vertical partition 32 cuts off the compartment 25 beneath the machinery space from an oil sump 27 which is covered by an inner bottom 33 at about half the depth of the base and which includes a large removable chip-catching strainer 34 beneath the usual working range of the carriage 18. The sump is on oil suction at the strainer head connection 35 and can be drained at plug 36. Carrying handles 37 are provided at each end of the base 11.

The ways 14 are welded to each end of the base by suitably strengthened connections not shown in detail. The preferred construction of the ways is of cold rolled heavy strip stock with head 14A and web 14B welded together. These ways have a heavy tray or plate 40 welded across from one to the other, over the space 25. This plate is the foundation for the motor 15, the chuck assembly 16A—16B, and the oil pump 41, all covered by a hood 17.

The stock turning mechanism consists of a conventional hollow spindle, not shown, on base 43 with front chuck 16A and rear chuck 16B projecting through openings in the front and rear walls, respectively, of the hood 17. The chucks are standard, requiring no further description. The spindle is driven by a ring gear 44 from a pinion 45 on the reduction gear box. The oil pump 41 at the opposite side of the spindle from the motor takes its power from the same ring gear. A suction line 47, part of which may be flexible to avoid the need of close pipe fitting, leads from the strainer head 35 to the pump, which discharges by connection 48, a flexible tube 49, and an upright pipe 50 on carriage 18, through an adjustable nozzle 51 which delivers cutting oil on the work W at the dies. When the nozzle stop-cock 52 is closed the oil is by-passed through relief valve 53. A switch 54, Fig. 2, with "forward," "off" and "reverse" positions is accessible through the side of the base compartment 25.

Carriage and tools

The carriage 18 consists of a base of longitudinal and transverse webs 60 and 61 riding on the ways 14 by guides 62 (Fig. 3), and a head 63 of I cross-section (Fig. 2) with front and back top and bottom guides 64A, B, C, D. The transverse web 61 of the base has a large opening 66 for passage of a link 67 actuated by a handle 68, the forward end of the link being pivoted to the carriage base at 69 on the side toward the chuck, and the handle being pivoted to the machine base 11 at 70. The effect is that the carriage is pulled instead of pushed toward the work by pushing the handle 68. The guides 62 fit rather freely on the ways 14, so that the carriage can float to some extent on the ways to conform to irregularities in the pipe. As is apparent from Fig. 3, the carriage can be removed entirely by sliding to the right, Fig. 2, thus lightening the machine for carrying. The head 63 is centrally divided down to the lower guides 64B, 64C to allow pipe to be dropped into the cutter.

Figure 3:
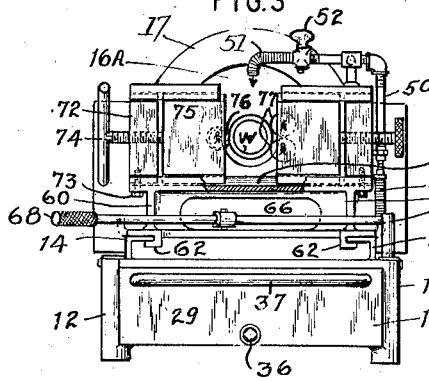
Fig. 3 is an elevation from the forward end of Fig. 2, looking to the left as indicated by arrows 3—3, with parts broken away, and all of the die head and reamer and their connections omitted for simplicity.
Figure 4:
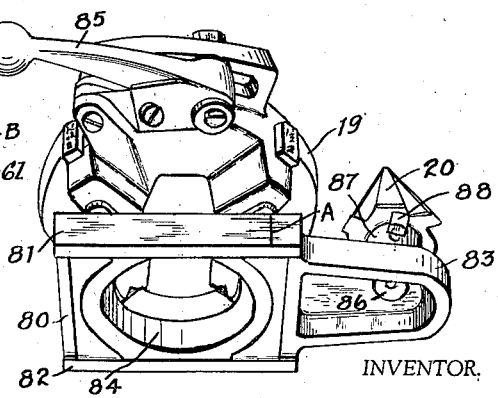
Fig. 4 is a rear perspective of the die head and reamer on their unitary mounting.
Figure 5:
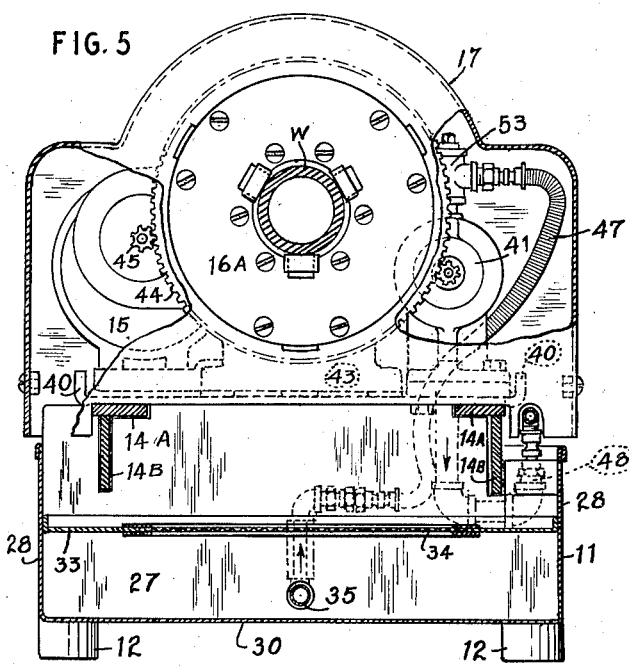
Fig. 5 is a transverse vertical section as indicated at 5—5, Fig. 1, with parts broken away.

The tools comprise a cutter and steady rest, preferably of the roller type and best shown in Fig. 3; and a combined die head and reamer, Fig. 4.

The cutter comprises a stationary yoke 72 set in the guides 64A, 64B, fixed in position by a machine screw 73 and removable only after taking out the screw. A handle and threaded shaft 74 move a block 75 in and out in the guides 64A, 64B carrying the cutting wheel 76 toward and from the steady rest. The steady rest is similar to the cutter except that a pair of broad-faced rollers 77 is substituted for the cutting wheel.

The combined die head and reamer, shown from the back and above in Fig. 4, consists of a carrier block 80 with top and bottom bearings 81 and 82 to ride in the guides 64C, 64D, and a side arm 83. The die head 19 is carried by the block 80, the block being centrally apertured as at 84 for passage of the pipe or other workpiece W. The die head is not in itself a feature of the present invention, but is of any well-known type suitable for this use, the one illustrated having a die opening and closing handle 85. The die head is set well out (to the left, Fig. 2) from the bearings 81, 82, so as to clear the carriage head 63. Since the carriage guides 62 depend for stability upon their extension to the right of Fig. 2 and do not extend far leftward, no part of the carriage 18 interferes with close approach of the die head to the front chuck 16A. As a consequence very short nipples can be threaded by this machine without special attachments. The reamer 20 is suitably attached to the arm 83, the specific attachment here being a stud 86 passing through a hub 87 which is integral with the arm 83, and held therein by a set-screw 88.

Figure 8:
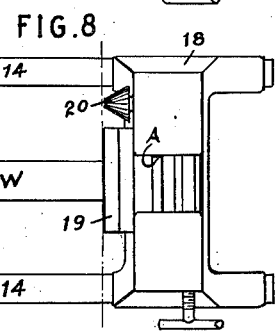

The die head 19 and the reamer 20 have their centers at the level of the chuck axis, as is apparent from Fig. 2, so that either may be brought into action on the work W by sliding the block 80 in its guides to one side or the other. When mark A on bearing 81 is aligned with the edge of the opening in the carriage head 63 the die head 19 is centered with the chucking spindle. This is illustrated in Fig. 8 but omitted from other figures for simplicity.

For gauging the length of the thread cut a gauge 90 on one of the ways 14 and a finger 91 on the carriage 18 are used. (Figs. 1, 2 and 11, and omitted from Figs. 6 to 10 inclusive.) The gauge is movable along one of the ways 14. The thread gauge 90 is a plate hooked loosely under one edge of a way 14, as at 92, and with the other edge 93 straight so it can be lifted off. Graduations thereon indicate the starting point of standard threading for whatever size pipe is indicated by the markings, and the edge 94 indicated by the arrow indicates the finish of the cut. Thus in Fig. 11 the end of pointer 91 is set on the straight part of the graduation for 1 to 2 inch pipe for the start of the cut, and the machine is stopped when the pointer end registers with the edge 94. In this way the operator can see more easily when to stop, since he does not have to watch for any particular gauge mark but only for the edge of the gauge no matter what the pipe size.

Operation

See Figs. 6 to 10 inclusive and Fig. 2. In Figs. 6 to 10 inclusive the dot-and-dash line indicates the same datum position for all figures.

Figure 6:
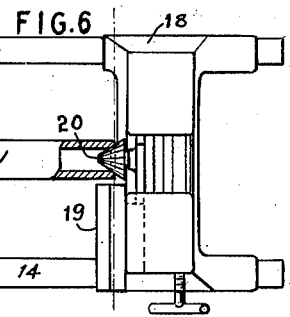
Figure 7:
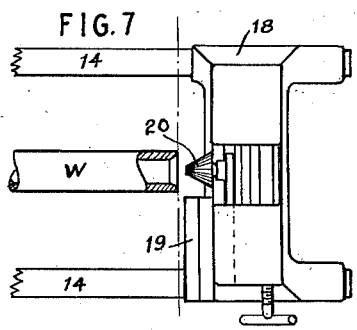

The reamer 20 being centered, Fig. 6, the pipe or other stock W is inserted through the spindle until its front end stops against the reamer, the chucks 16A, 16B are clamped, the motor 15 started, and the handle 68 moved in until the reaming is completed. The handle 68 is then moved out, retracting the carriage and thus withdrawing the reamer, Fig. 7. The block 80 is slid over until the die head 19 is centered opposite the pipe end (coincidence of mark A with the edge of the middle opening in the carriage head indicating central position); the die head is closed (if an opening type—solid die heads may be used with this machine) and the carriage moved in to start the threading, Fig. 8. At this time the proper graduation on the gauge 90 is brought under the edge of the pointer 91.

The motor is again started and handle 68 moved in. Since the pivot 69 is on the inner edge of the carriage base the carriage 18 is pulled rather than pushed to the work. The handle 68 is pivoted outside of and above the rear foot 62 of the carriage to allow maximum travel without an unfavorable lever angle. This lever arrangement, and the linkage pivot being above the ways, and transmitting moving force to the carriage so as to pull instead of push, give an easier and more accurate action because the pivot 69 is directly under the pipe, and the carriage guides 62 follow instead of lead, so there is no tendency of the guides 62 to lock against the ways 14; the guides and the ways do not require high accuracy, and the carriage can float upon the ways while the block 80 can float in its guides 64C, 64D, all parts thus adjusting themselves to the pipe. The pipe is firmly held at wide spaced positions by the chucks 16A, 16B which are well separated.

Figure 10:
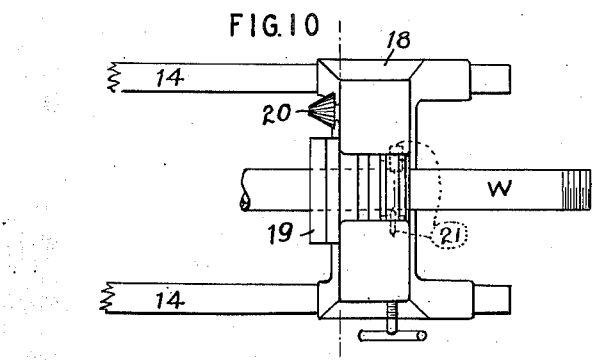
Figure 9:
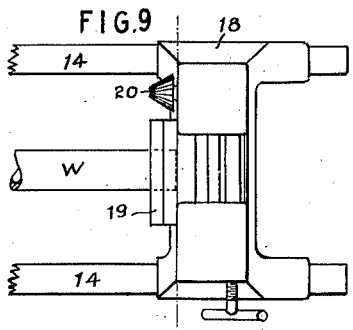

When carriage travel during threading brings the pointer 91 into register with the gauge edge 94 the operator stops the motor, opens the die, and moves the handle 68 to bring the carriage to the cut-off position, Fig. 10. If a solid die is used it will be necessary to reverse the motor, back the die off the thread, and slide die and reamer to one side out of the way, either as shown in Fig. 2 or to the opposite side, before cutting can be done.

Fig. 2 illustrates the cut-off position. For the sake of better illustration the tool carrying block 80 is here shown as moved toward the observer, out of the way of the pipe, although in practice it would more probably be cleared by moving it in the other direction. The carriage 18 has been moved along pipe W after the last threading to cut off the desired length. The steady rest rollers 77 and the cutter wheel 76 are brought up against the pipe, the motor is started, and the cutter wheel is fed in by its handle 74 until the cut is completed.

Although I have here disclosed certain preferred embodiments of my invention it will be understood that it is not limited to the specific forms shown but may be modified within the scope of the appended claims.

I claim:

1. In a threading and cutting machine a work-holding spindle and a carriage movable toward and from said spindle, said carriage comprising a transverse head with a cut-off tool on the back and with guides on the front parallel to said cut-off tool, a block slidable in said guides transversely of the work, said block carrying on one portion a die head, and on another portion a reamer, said die head and said reamer being side by side in horizontal alignment and having their centers in the horizontal plane of the spindle axis and a central passage in said head for work in the machine.

2. In a threading and cutting machine in combination, a work-holding spindle, guideways extending forwardly of said spindle, a carriage movable loosely on said guideways toward and from said spindle, two parallel sets of transverse guides on said carriage, a unitary holder slidable in said transverse guides, a die head and a reamer on said holder, and a cut-off tool in the other set of said transverse guides, said unitary holder being movably transversely into and out of alignment with work in said spindle.

3. In a threading and cutting machine, a base, a chucking spindle and ways forward of said base, a tool carriage movable on said ways, moving means for said carriage comprising a lever pivoted to said base outside of said ways and a link pivoted to said lever and to the inner edge of said carriage, feet on said carriage slidable on said ways, said lever and link and all said pivots being in the same horizontal plane above the carriage feet of said carriage, and the pivot of said link to said carriage being in the same longitudinal vertical plane as the axis of the work.

4. In a threading machine including ways and a carriage movable thereon, a gauge comprising a plate slidable upon one of said carriage ways, graduations on said gauge indicating starting points for different thread lengths, and an edge indicating the finish point for every thread length, a pointer on said carriage readable against said gauge, said gauge being manually movable along the ways but not movable by the carriage.

5. In a threading and cutting machine, a chucking spindle, carriage ways, and a tool carriage slidable on said ways, moving means for said carriage comprising a lever and a link pivotally connected to said lever and to said carriage, the pivotal connection of said link to said carriage being on the side of the carriage toward said chuck, whereby movement of said carriage toward said chucking spindle is by a pulling effect.

ROGER TEWKSBURY.